METHOD OF REGENERATING WASTE PICKLE LIQUORS

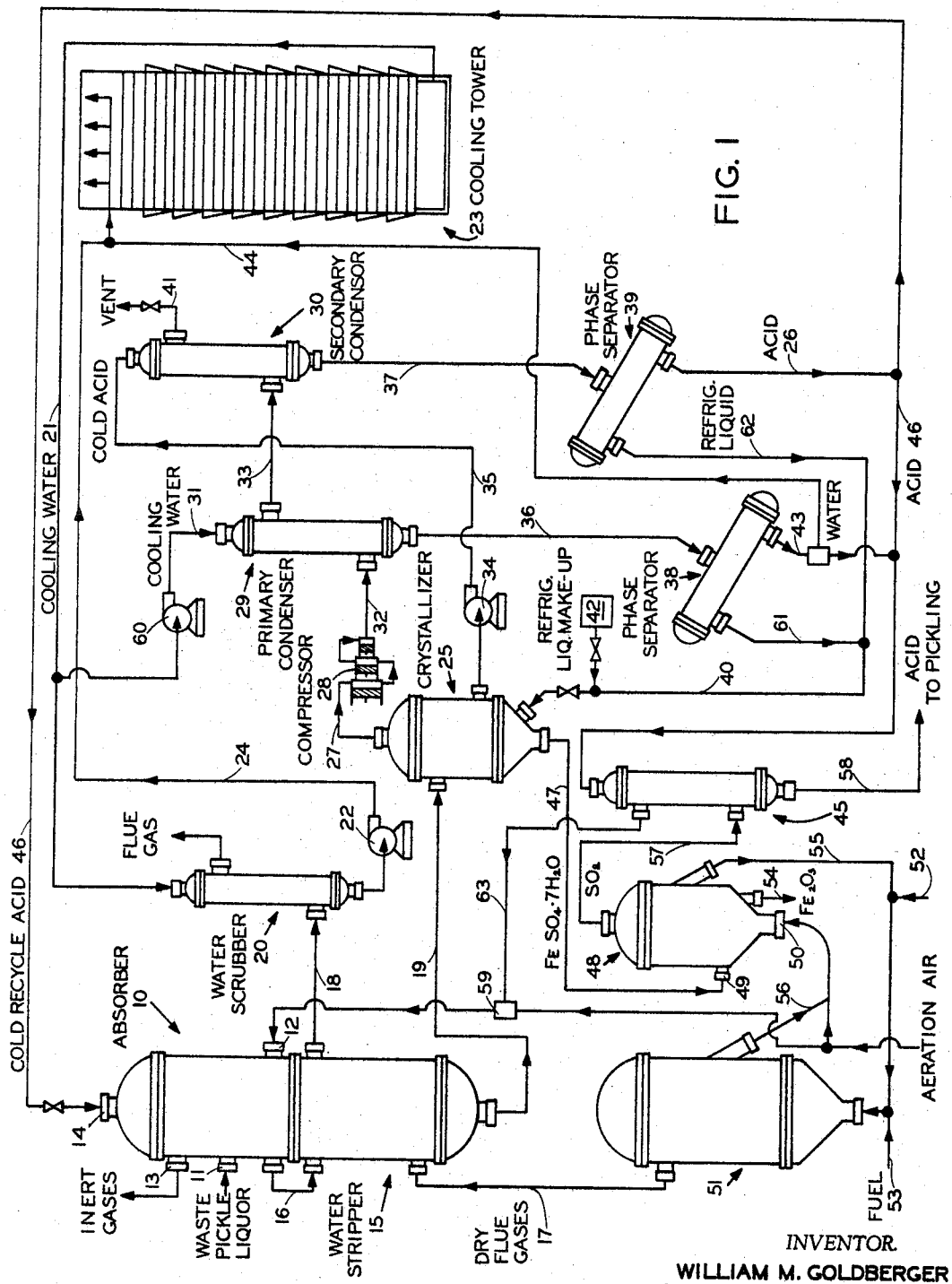

Filed Dec. 3, 1963

STARTING MATERIALS

WASTE LIQUOR
- $H_2SO_4$
- $FeSO_4$
- $H_2O$

AIR

PROCESSING STEPS

- ABSORBTION
- WATER STRIPPING
- CONDENSATION
- CRYSTALLIZATION
- ACID SCRUBBING
- DECOMPOSITION
- COMBUSTION

BOTTOMS
- $H_2SO_4$
- $FeSO_4$
- $H_2O$

RECYCLE ACID
- $H_2SO_4$
- $FeSO_4$
- $H_2O$

BOTTOMS
- $H_2SO_4$
- $FeSO_4$
- $H_2O$

SCRUBBER ACID
- $H_2SO_4$
- $FeSO_4$
- $H_2O$

GASES
- $SO_2$
- $O_2$
- $H_2O$

CRYSTALS
- $FeSO_4 \cdot 7H_2O$

FLUE GASES
- $CO_2$
- $O_2$
- $N_2$
- $H_2O$ $Fe_2O_3$ — $Fe_2O_3$

FUEL OIL
AIR

PRODUCTS

FUMES
- $O_2$
- $N_2$
- $H_2O$

FUMES
- $CO_2$
- $O_2$
- $N_2$
- $H_2O$

FORTIFIED ACID
- $H_2SO_4$
- $FeSO_4$
- $H_2O$

IRON OXIDE
- $Fe_2O_3$

FIG. 2

INVENTOR.
WILLIAM M. GOLDBERGER
BY *Tray, Mace & Dunson*
ATTORNEYS

United States Patent Office 3,387,927
Patented June 11, 1968

3,387,927
METHOD OF REGENERATING WASTE
PICKLE LIQUORS
William M. Goldberger, Columbus, Ohio, assignor, by mesne assignments, to The Battelle Development Corporation, Columbus, Ohio, a corporation of Delaware
Filed Dec. 3, 1963, Ser. No. 327,653
4 Claims. (Cl. 23—126)

ABSTRACT OF THE DISCLOSURE

A process for regenerating used aqueous sulphuric acid pickle liquor which consists of contacting the used liquor with sulphur dioxide and a source of oxygen so as to enrich the liquor in sulphuric acid content and lower the solubility of the contained iron-sulphur salts and then rapidly cooling the liquor to a temperature of solution instability disposed to cause the iron-sulphur salts to crystallize and precipitate out. The iron-sulphur salts are then preferably decomposed to supply sulphur dioxide for contact with more used pickle liquor with an oxygen source.

---

This invention relates generally to a method of regenerating sulfuric acid from the spent sulfuric acids from pickling operations. More precisely, the process of this invention produces from the waste pickle liquors a regenerated aqueous solution containing dissolved sulfuric acid and metallic sulfates at sufficient strength to be an effective pickling agent in continuous pickling baths.

Disposal of waste pickle liquors has been and still is an expensive and troublesome problem to the steel industry and other industries. Many processes have been proposed that would utilize or regenerate the waste liquors, but these processes have been found to be either unsuited to complex steel mill practice or uneconomical in other industries. The mills have resorted to neutralization and other disposal methods.

In order to regenerate a spent pickle liquor from steel pickling, iron must be separated from the solution of iron sulfate in low-strength sulfuric acid. The spent pickle liquor from steel pickling usually contains less than about 15 percent by weight of sulfuric acid and more than 4 percent by weight of iron sulfates. Also, the sulfuric content of the iron sulfate must be converted back to sulfuric acid for reuse. Regeneration of spent liquors at the present time usually involves the steps of (1) crystallizing iron sulfate from the solution, (2) decomposing the iron sulfate crystals to form gaseous sulfur oxides, and (3) reacting the sulfur oxides to form sulfuric acid. Crystallization of iron sulfate from the spent liquor solution can be made to occur by various means. The iron sulfate is less soluble at higher acid concentrations and crystallization can be induced by either adding strong sulfuric acid or by evaporating water. The temperature affects the solubility of iron sulfate in sulfuric acid, and it also affects the chemical structure of the solid iron sulfate crystal that forms during crystallization. The crystallization step of the prior art regeneration processes has varied, but usually crystallization takes place either at the ambient temperature or at the boiling point of the spent acid solution.

The sulfur content of the iron sulfate crystal is normally regained by first decomposing the salt crystal. Decomposition of the iron sulfate crystals by heating in an oxidizing atmosphere is most common, and this produces solid ferric oxide and a gas mixture containing sulfur dioxide and sulfur trioxide. The sulfur dioxide can be oxidized to sulfur trioxide and reacted with water to form sulfuric acid. The oxidation of sulfur dioxide can be accomplished by either a gas-phase reaction using a catalyst or by a liquid-phase reaction in which trivalent iron ions catalyze a reaction between $SO_2$ and oxygen at a liquid-gas interface.

Many of the processes of the prior art are technically sound and some have been operated on the commercial scale. However, none as yet have proved to be economical. The major obstacle in developing an economical process has been the low cost of sulfuric acid and iron sulfates which are the products of the regeneration; therefore, the allowable investment for their practical recovery is very limited.

It is, therefore, an object of this invention to efficiently increase the sulfuric acid concentration in a sulfuric acid pickle liquor solution.

It is another object of this invention to economically remove iron sulfate from a sulfuric acid pickle liquor solution.

It is a further object of this invention to efficiently decompose iron sulfate crystals.

It is still another object of this invention to cool a sulfuric acid pickle liquor solution by introducing a volatile organic immiscible liquid into the said pickle liquor solution.

It is another object of this invention to process waste pickle liquor in a system which does not employ steam boilers or heat transfer surfaces anywhere in the process.

Still other objects and advantages of the subject process will become apparent from the following detailed description thereof.

In general, the process of this invention may be described as regenerating expanded waste pickle liquor containing low-strength sulfuric acid solution with dissolved iron sulfates, removing iron sulfate and regenerating $SO_2$ from the removed iron sulfates. This is accomplished by effecting intimate contact between a mixture of sulfur dioxide ($SO_2$) and air and the low-strength, expended waste pickle liquor. The trivalent iron ions in the pickle solution act as a catalyst to stimulate the oxidation of $SO_2$ to sulfur trioxide ($SO_3$) when the $SO_2$, air, and pickle liquor are intimately mixed. The oxidation step proceeds at the gas-liquid interface. The $SO_3$ gas is immediately dissolved in the pickle liquor solution to form more sulfuric acid ($H_2SO_4$) and increase the concentration of $H_2SO_4$ in the acid pickle solution. The temperature of the pickle liquor at this point is over 70° F.

The sulfuric acid enriched pickle liquor solution is next mixed with a volatile organic immiscible liquid whose temperature is in the order of 0° C. The warm acid solution causes the volatile organic liquid to immediately vaporize (flash-off). This reaction rapidly removes heat from the pickle liquor solution and quickly lowers the acid solution temperature. Because of the increased sulfuric acid concentration and the rapid drop in pickle liquor temperature, the solution stability limits of iron sulfates are exceeded. The net result of this is the rapid precipitation of iron sulfate crystals from solution.

The precipitated iron sulfate crystals are separated from the acid-organic liquid solution and sent to a reaction vessel where they are decomposed into $SO_2$ and iron oxide ($Fe_2O_3$). The $Fe_2O_3$ is removed from the process steam for use elsewhere; the $SO_2$ is recycled with air into the vessel where the waste pickle enters into the subject processing system for treatment and recovery.

Some of the enriched sulfuric acid solution will have water added and will then be sent to the pickling process for reuse, while the remainder will be recycled in the recovery system for heat exchange purposes and reprocessing.

The vaporized organic liquid is compressed, liquified, recovered, and reused in the subject process.

The entire process is a continuous operation which results in waste pickle liquor of low sulfuric acid concentration (unsatisfactory for additional pickling use) being economically converted into a higher acid concentration pickle liquor reusable for pickling operations.

Though this invention is principally for the recovery or waste pickle liquors from steel-treating processes, it is by no means limited to this one particular application. This process lends itself to the recovery of waste-pickle liquor of other processes which employ pickling procedures, e.g., waste liquors in electroplating processes.

In the process of this invention, several novel aspects in the technology of waste liquor treatment are employed to reduce the equipment costs and to make the economics of pickle liquor recovery quite favorable. For example, by the process of this invention, crystallization of iron sulfates is made to occur at relatively low acid strength and, therefore, evaporation of large amounts of water is unnecessary. Although some evaporation of water is required in this process, steam is not used and a steam boiler is not needed. Furthermore, a novel arrangement of process equipment allows heat to be transferred directly from one process stream to another without need for heat transfer surfaces to isolate the components. No heat exchangers or heat transfer surfaces are needed anywhere in the process, yet the heat economy is excellent. Direct-contact heat transfer provides high-heat transfer rates and heat losses are reduced to a minimum.

In addition, several key processing steps of this invention take place at relatively low temperature. The corrosive nature of sulfuric acid is markedly reduced at the low temperatures involved and few corrosion-resistant materials are required; thus the cost of process equipment is substantially less than for other process methods.

The unique features of this process relate to the manner in which the crystallization is made to occur and the method of transferring heat from one process stream to another.

In this process, crystallization of iron sulfate from a sulfuric acid solution is effected by taking advantage of the fact that (1) iron sulfate is less soluble in higher sulfuric acid concentrations and (2) iron sulfate solubility in sulfuric acid decreases as the solution temperature is lowered. Acid concentration is increased by the formation of new sulfuric acid from the reaction of the water in the waste pickle liquor with gaseous sulfur dioxide ($SO_2$) and oxygen ($O_2$) from the air; removal of part of the water in the pickle liquor also increases the concentration of sulfuric acid in the said liquor. In addition, precipitation of iron sulfate is instigated by lowering the temperature of the sulfuric acid pickle solution containing the dissolved iron sulfate by introducing a volatile organic liquid to the acid solution. The volatile organic liquid is immiscible with the sulfuric acid pickle solution. The organic liquid flashes off (evaporates very rapidly) on contact with the acid solution. This flashing-off process (evaporation) removes heat from the acid solution, thereby lowering the acid solution temperature. The drop in temperature catalyzes the precipitation process of the iron sulfate from the acid solution.

In the process of this invention, the spent liquor that is discharged from the pickling operations is first contacted with gases containing sulfur dioxide. The trivalent iron that is formed in the waste liquor serves to catalyze a reaction between the sulfur dioxide and oxygen from the air that is supplied in excess with the sulfur dioxide containing gases. The autocatalytic oxidation of sulfur dioxide increases the surfuric acid content of the waste acid.

The enriched waste acid is then contacted with hot combustion gases to further increase the acid strength by evaporation of water from the liquor into the hot gases.

The liquor is then sent to a crystallizer where the temperature is lowered, which causes iron sulfates to crystallize. In the crystallizer, heat is removed from the acid solution entering the crystallizer and is transferred to another substance which is in direct contact with the acid solution. This is conveniently done by introducing into the crystallizer a volatile liquid that is immiscible with the acid solution. By maintaining the temperature of the crystallizer above the boiling point of the volatile liquid, this second liquid vaporizes and in so doing removes heat from the pickle liquor solution. The transfer of heat from the pickle liquor to the vaporizing liquid lowers the temperature of the pickle liquor and causes iron sulfate crystals to form.

The choice of the second liquid is based on its properties of vapor pressure and solubility in aqueous solutions of iron sulfate in sulfuric acid. It is necessary that under the conditions of temperature and pressure in the crystallizer the vapor of this second liquid be its stable phase. Because of the temperatures experienced in this process, organic liquid with boiling points ranging from $-45°$ C. to $110°$ C. would fill the volatility requisite. Also, it is desirable that the second liquid be immiscible with the pickle liquor solution. Paraffinic hydrocarbon liquids such as n-butane, iso-butane, butene-1, and propane can be satisfactorily used in this process.

The solids that are formed in the crystallizer are collected and heated to a temperature that is above the decomposition temperature of the iron sulfates. Decomposition occurs and yields solid iron oxide and a gaseous mixture of sulfur dioxide, sulfur trioxide, and steam. The relative amounts of the sulfur oxide gases depends on the temperature of the decomposition. These gases, after mixing with air, serve as the sulfur dioxide containing gases with which the incoming pickle liquor is first contacted.

The acid solution which leaves the processing system contains at least 12.5 percent by weight of sulfuric acid and substantially less iron sulfate than that which entered the processing system.

The sensible heats and reaction heats involved in the process may be conserved by the exchange of heat from one process stream to another. The steps of the process and the method of heat exchange between process streams will be best understood from the following detailed description of the accompanying drawing in which:

FIG. 1 is a semidiagrammatic illustration of a system suitable for carrying out a preferred embodiment of the invention.

FIG. 2 is a material flow diagram for the system of FIG. 1.

The material flow diagram (FIG. 2) clearly illustrates the effective heat and mass transfer processes of the system. Air, combustion gases, and iron sulfate decomposition gases are made to flow, as much as possible, in a countercurrent direction to pickle liquor flow and engage in intimate contact with the liquor. Heat transfer is efficiently realized from the direct contact of gases and liquid. Also during these gas-liquid contact periods $SO_2$ is oxidized to $SO_3$ which is then absorbed immediately into the waste pickle liquor solution to enrich the sulfuric acid concentration of the pickle liquor. This process is conducted efficiently in the absorption tower.

From the combustion of fuel oil and air in the combustor, where iron oxide ($Fe_2O_3$) circulates to and from the iron sulfate decomposer, residual waste flue gases containing large amounts of sensible heat are directed to pass in a countercurrent direction to the pickle liquor flow in the water stripper. The heat exchange from the hot flue gases induces the evaporation and removal of some water from the pickle liquor. This step further increases the concentration of $H_2SO_4$ in the pickle liquor. The flue gases somewhat cooler now and saturated with water vapor, pass through the condenser where most of the water vapor condenses and is returned to the system as make-up water to the pickle liquor leaving the crystallizer. The cooled flue gases with a little water vapor are vented to the atmosphere.

Crystallization and precipitation of the iron sulfate crystals from solution of the pickle liquor is effected in the crystallizer where the warm liquor and a cold immiscible organic liquid exchange heat and incite the precipitation of iron sulfates.

The iron sulfate crystals are separated and sent to the decomposer where decomposition of the crystals takes place.

The gaseous decomposition products from the iron sulfates ($SO_2$, $O_2$ and $H_2O$) leave the decomposer and enter the acid scrubber which also receives the pickle liquor residue from the crystallizer. Some of the said gases react to form more sulfuric acid and still further enrich the sulfuric acid content of the pickle liquor. This enriched acid is transferred, as fortified acid suitable for reuse, to the pickling process.

The unreacted $SO_2$ gas from the above step is enriched with air and directed into the entering waste liquor in the system which also gets enriched scrubber acid.

Iron oxide ($Fe_2O_3$) is removed from the system and also recycled continuously in the decomposer and combustor for heat exchange purposes in a fluidized bed.

Referring now in detail to FIG. 1, the functions and cooperations of the systems and apparatus shown therein will be forthwith explained.

The waste pickle liquor from a pickling bath containing, for example, about 8 percent sulfuric acid and 12 percent iron sulfate enters absorber 10 through pipe 11. Sulfur dioxide containing gases enter the absorber through pipe 12. The direct contact of the gases and the waste acid liquor is suitably accomplished by allowing the gases to rise upward in countercurrent flow to the downward passage of the acid liquor. A plate column or the simpler packed tower construction is suitable for absorber 10. The temperature in the absorber is maintained at about 175° F. to obtain optimum reaction rates. Various means may be employed to control temperature. An effective method is to control the relative amounts of the components entering the absorber.

The unabsorbed gases leave absorber 10 through exit pipe 13. These gases are saturated with water vapor and are cooled before leaving the absorber by a stream of cold recycle acid that enters the top of the absorber through pipe 14. The direct contact of the cold acid with the gases at the top of the absorber causes condensation of water vapor and prevents excessive loss of water from the process system. The gases from exit pipe 13 can be vented to the atmosphere.

The cold recycle acid also moderates the temperature in absorber 10 by absorbing a part of the exothermic heat of the oxidation reaction of sulfur dioxide ($SO_2$) to sulfur trioxide ($SO_3$) and the heat of solution of ($SO_3$) converting to sulfuric acid that takes place in the absorption zone. Thus, the temperature in the absorber can be very conveniently controlled by adjusting the rate of the cold recycle acid.

The waste acid liquor leaving the absorber is not sufficiently enriched with acid for the crystallization step. Further enrichment is made to occur before crystallization by evaporating a portion of the water contained. Evaporation is accomplished in water stripper 15 where the liquor from the absorber is contacted with hot, relatively dry flue gases from combustor 51. Water stripper 15 can also be packed tower arranged so that the acid liquor from the absorption section enters the upper part of water stripper 15 through pipe 16. The hot flue gases enter stripper 15 at the lower part through pipe 17.

The countercurrent contact of the rising flue gases with the falling acid liquor results in a transfer of heat from the flue gases to the liquor and simultaneous evaporation of water from the liquor to the gases. Thus, the cooled flue gases leave the stripper through exit pipe 18 containing considerable water vapor and the liquor leaves the stripper at 19 with a higher acid strength than that in the liquor entering the stripper.

Condenser (water scrubber) 20 is provided to cool the saturated flue gases from water stripper 15 and thereby prevent excessive losses of water from the processing system. The cooling and condensing action in the condenser 20 is accomplished by direct contact of cold water which enters the top of condenser 20 through pipe 21 and the saturated flue gases which enter at the lower part of the condenser. Pump 22 returns the cooling water and the condensate to cooling tower 23 through pipe 24.

The concentrated liquor leaving the water stripper 15 enters crystallizer 25 through pipe 19. This acid solution contains about 18 per cent sulfuric acid and about 10 percent of iron sulfate. The entering acid is cooled in the crystallizer whereupon the acid becomes saturated with respect to iron sulfates and further cooling causes iron sulfate crystals to precipitate from the solution. The crystallizer operates at essentially atmospheric pressure. A volatile refrigerant liquid, such as n-butane, that is immiscible and nonreactive in the acid solution is fed to the crystallizer at a higher pressure than atmospheric through pipe 40. The temperature in the crystallizer is maintained suitably above the atmospheric boiling point of the volatile liquid refrigerant, so that it vaporizes (flashes) immediately upon entry into the crystallizer. For example, the temperature in the crystallizer would be maintained at about 32° F. when n-butane is used as the refrigerant liquid.

The evaporation or the "flashing" of the volatile liquid is an endothermic process and thus heat is removed from the acid liquor in the crystallizer and transferred to the volatile liquid substance. The removal of heat from the acid solution causes the temperature therein to be lowered, thus causing the crystallization of iron sulfates to occur.

The vapors of the volatile refrigerant substance leave the crystallizer through pipe 27 and are repressurized in compressor 28 to a pressure suitable for effective condensation at cooling water temperatures. For example, a gage pressure of 55 p.s.i.g is a satisfactory recompression level when butane is used as the refrigerant liquid.

Condensation of the pressurized vapors is made to occur by passing the vapors through primary condenser 29 and secondary condenser 30 which are arranged in series. Cooling water is used to promote condensation in primary condenser 29, and it is pumped by pump 60 through the upper part of the condenser through pipe 31. The vapors from the compressor 28 enter the lower part of the condenser 29 through pipe 32. The condenser construction may be simply a packed tower contact unit.

Vapors that are not condensed in the primary condenser 29 pass through vapor outlet 33 into the lower part of secondary condenser 30. Cold acid from the crystallizer is pumped by acid pump 34 through pipe 35 to the top of secondary condenser 30 and is allowed to flow downward in condenser 30 in direct contact with the rising vapors of uncondensed refrigerant substance. Secondary condenser 30 may also be a packed tower and similar in construction to primary condenser 29.

The condenser of the volatile liquid that forms in condensers 29 and 30 goes from the bottom of the condensers through pipes 36 and 37, respectively, into phase separators 38 and 39. Because the refrigerant liquid is immiscible with water or aqueous solutions, it separates and is withdrawn from the upper part of the phase separators 38 and 39 through pipes 61 and 62, respectively, and is returned to the crystallizers through pipe 40. Minor losses of the volatile liquid substance, as for example, through vent 41 are balanced by make-up refrigerant liquid that is fed from storage 42 into refrigerant feed pipe 40.

The aqueous phase from primary phase separator 38 is relatively pure water. A part of this water is returned through T 43 and pipe 44 to cooling water 23. The balance of the aqueous phase is added to the aqueous acid phase from the secondary phase separator in line 26 and the combined acid stream is sent to acid scrubber 45 through pipe 46. Pipe 46 is valved so as to direct the acid from pipe 26 into two directions.

The addition of some of the water from primary phase separator 38 to the acid leaving the secondary phase separator 39 is done to maintain a balance of water in the over-all process system. Although it is advantageous to evaporate water from the liquor before it enters the crystallizer, in order to increase its acid strength, it is also necessary that a similar quantity of water be returned to the acid to prevent a continual withdrawal of water from the acid and a subsequent increase in acid strength beyond the operability limits of the process.

The crystals of iron sulfate that are formed in crystallizer 25 are withdrawn from the bottom of the crystallizer through pipe 47, and transported to decomposer vessel 48. Heat is supplied to the crystals in the decomposer and the temperature of the crystals is raised above their decomposition temperature, thus promoting a decomposition reaction to produce solid iron oxide and gaseous sulfur dioxide, sulfur trioxide, and some water vapor. The relative amount of the sulfur dioxide and sulfur trioxide depends on the temperature that is maintained in decomposer vessel 48. Higher temperatures favor higher relative amounts of sulfur dioxide. A practical temperature in the decomposer is about 1600° F.

Various means may be employed to furnish heat to the decomposer. Carbonaceous fuels such as fuel oil can be burned directly in a kiln into which the iron sulfate crystals are introduced. The kiln may be made to rotate to promote better mixing of the combustion products and the mass of decomposing crystals. A convenient method for conducting the decomposition reaction is to suspend the crystals of iron sulfate on a stream of gas and simultaneously heat the suspended or "fluidized" crystals to their decomposition temperature. Either dry crystals or a slurry of the crystals may be readily introduced into a vessel in which they are fluidized and decomposed. For example, a slurry of iron sulfate crystals in the liquor from the crystallizer can be fed directly to a fluidized-bed decomposition vessel. A stream of air entering the bottom of the decomposer serves to maintain fluidization of the iron oxide decomposition product and any crystals of iron sulfates not decomposed. Heat can be furnished to the fluidized-bed decomposer by either direct combustion within the decomposition vessel, by preheating the components that are fed to the decomposition vessel, or by transfer of heat from some medium substance to the components in the fluidized bed.

A preferred method for supplying the heat needed for the decomposition is shown in FIG. 1. Decomposer vessel 48 is operated as a fluidized bed consisting essentially of iron oxide particles that are suspended on the gases that move upward in decomposer 48. Crystals of iron sulfate are fed into the decomposer 48 either dry or as a slurry through feed pipe 49. Air is made to enter at the bottom of the decomposition vessel through inlet 50 to promote fluidization. The fluidized bed consists essentially of the iron oxide that was generated in the decomposer by the decomposition of iron sulfate crystals in the presence of air. Heat is supplied to decomposer 48 by introducing additional iron oxide particles that are at a substantially higher temperature than the temperature within decomposer 48. The difference in temperature allows heat to be transferred from the entering iron oxide to the iron oxide already in the fluidized bed and to the other components in the decomposition vessel. A balance of solids is maintained in decomposer 48 by removing iron oxide from the fluidized bed through pipe 55 at a rate essentially equal to the rate at which iron oxide is introduced into decomposer 48, through pipe 56. The iron oxide removed from decomposer 48 leaves the decomposer at the temperature that exists within the decomposer. This iron oxide is again used to supply additional heat to the decomposer by heating this iron oxide to a higher temperature and returning it to the decomposer. Thus, iron oxide is recirculated through decomposer 48 and through a separate heater unit, combustor 51, and acts in effect as a circulating heat transfer medium to supply the endothermic heat requirements at decomposer 48. Pipes 55 and 56 serve to transfer the circulating iron oxide from one vessel to the other.

Combustor 51 can also be operated as a fluidized bed to simplify the integration of decomposer and combustor and to enable the transfer of the iron oxide heat-transfer medium from one vessel to the other without the need for complex mechanical devices and moving parts. Combustor 51 is supplied with combustion air through pipe 52. This air can be mixed with a fuel, such as fuel oil, in pipe 53 prior to entering fluidizing bed combustion vessel 51.

As noted, the decomposition of iron sulfates produces iron oxide. To prevent an accumulation of this material in the system, it is removed, preferably from the decomposer through pipe 54.

The dry flue gases leave the combustor through pipe 17 and enter water stripper 15 as previously described.

The gases from the decomposer also leave decomposer 51 at the temperature in the fluidized bed. It is desirable to cool these gases prior to admitting them into absorber 10. A convenient and effective method of cooling these gases is to contact them with acid liquor from the phase separators. This step can be accomplished in a packed tower by introducing the acid to the top of acid scrubber 45 through pipe 46 and introducing the gases from the decomposer at the base of acid scrubber 45 through pipe 57. The cooling of the decomposer gases also causes water to condense from the gases and to collect in the acid, thus diluting the acid slightly. The consequence of the action in the acid scrubber is to dilute and heat the acid liquid before it is returned to the pickling tanks through pipe 58.

The gases leaving the acid scrubber through pipe 63 are cooled and can be sent to absorber 10. These gases are, however, first blended with air to provide oxygen for the oxidation of the sulfur dioxide therein contained. The blending of air with the gases from acid scrubber 45 is made to occur at mixing T 59. The gas mixture thus formed contains sufficient excess air to promote rapid oxidation in the absorbing unit 10.

The acid liquor thus processed and regenerated as described is suitably enriched by the process of this invention to be an effective agent for use in the pickling of steel products.

A plant to accommodate a processing system of the type shown in illustrative FIG. 1 and operating with butane refrigeration requires a compressor of about 500 H.P. rating, with the flow rate of the butane refrigerant of approximately 190 gallons per minute to process 100,000 gallons per day of waste pickle liquor.

It will be understood from the foregoing description and illustrations that the process of the invention involves numerous apparatus and interactions, and it is intended to cover all changes and modifications of the example of this invention herein chosen for the purpose of illustration which do not constitute departures from the spirit and scope of this invention.

I claim:
1. A process for regenerating aqueous sulphuric acid pickle liquor that contains residual iron-sulphur compounds comprising:
   (a) contacting said liquor with sulphur dioxide and an oxygen source at a temperature and pressure disposed to effect oxidation of said sulphur dioxide to sulphur trioxide and form sulphuric acid in said liquor so as to enrich said liquor in sulphuric acid; and
   (b) refrigerating said enriched solution to a temperature wherein at least a portion of said iron-sulphur compounds are caused to precipitate from said liquor.

2. The process of claim 1 wherein said refrigeration step consists of introducing a volatile, immiscible organic liquid into said enriched pickle liquor said organic liquid being disposed to vaporize and absorb heat from said pickle liquor to lower its temperature.

3. The process of claim 2 wherein said precipitate is decomposed to yield sulphur dioxide which is then utilized in the step of sub-paragraph (a) to effect a continuous process.

4. The continuous process of claim 3 wherein said decomposition step is effected in a fluidized bed or iron oxide particles acquired from previous decomposition of said crystals in said continuous process.

References Cited

UNITED STATES PATENTS

| | | | |
|---|---|---|---|
| 2,007,510 | 7/1935 | Thornton | 23—1 X |
| 2,304,178 | 12/1942 | Keyes | 23—126 X |
| 2,566,337 | 9/1951 | Kassel | 23—1 X |
| 3,053,626 | 9/1962 | Patterson | 23—177 |

EARL C. THOMAS, *Primary Examiner.*